United States Patent
Sarwer et al.

(10) Patent No.: US 10,595,033 B2
(45) Date of Patent: Mar. 17, 2020

(54) VARIABLE LENGTH CODING OF HEADER DATA FOR IMAGE COMPRESSION

(71) Applicant: SONY CORPORATION, Tokyo (JP)

(72) Inventors: Mohammed Golam Sarwer, San Jose, CA (US); Ali Tabatabai, Cupertino, CA (US)

(73) Assignee: SONY CORPORATION, Tokyo (JP)

(*) Notice: Subject to any disclaimer, the term of this patent is extended or adjusted under 35 U.S.C. 154(b) by 106 days.

(21) Appl. No.: 15/433,251

(22) Filed: Feb. 15, 2017

(65) Prior Publication Data

US 2018/0234694 A1  Aug. 16, 2018

(51) Int. Cl.
| | | |
|---|---|---|
| *H04N 7/12* | (2006.01) | |
| *H04N 19/48* | (2014.01) | |
| *H04N 19/61* | (2014.01) | |
| *H04N 19/124* | (2014.01) | |
| *H04N 19/146* | (2014.01) | |
| *H04N 19/13* | (2014.01) | |
| *H04N 19/176* | (2014.01) | |
| *H04N 19/184* | (2014.01) | |
| *H04N 19/182* | (2014.01) | |

(52) U.S. Cl.
CPC .......... *H04N 19/48* (2014.11); *H04N 19/124* (2014.11); *H04N 19/13* (2014.11); *H04N 19/146* (2014.11); *H04N 19/61* (2014.11); *H04N 19/176* (2014.11); *H04N 19/182* (2014.11); *H04N 19/184* (2014.11)

(58) Field of Classification Search
CPC .................. H04N 19/00781; H04N 19/157
USPC ...................................................... 375/240.23
See application file for complete search history.

(56) References Cited

U.S. PATENT DOCUMENTS

| | | | |
|---|---|---|---|
| 6,915,014 B1* | 7/2005 | Honma | H04N 19/176 375/E7.13 |
| 9,008,448 B2 | 4/2015 | Park et al. | |
| 9,544,597 B1* | 1/2017 | Han | H04N 19/176 |
| 2010/0220793 A1* | 9/2010 | Jang | H04N 19/70 375/240.25 |
| 2013/0027230 A1 | 1/2013 | Marpe et al. | |
| 2013/0170748 A1 | 7/2013 | Thyagarajan | |
| 2013/0336388 A1* | 12/2013 | Terada | H04N 19/90 375/240.03 |
| 2013/0336395 A1* | 12/2013 | Joshi | H04N 19/176 375/240.12 |
| 2014/0177707 A1 | 6/2014 | George et al. | |
| 2015/0245076 A1 | 8/2015 | Lynch et al. | |

* cited by examiner

*Primary Examiner* — Richard T Torrente
(74) *Attorney, Agent, or Firm* — Chip Law Group

(57) ABSTRACT

An image-processing apparatus and method for variable length coding of header data for image compression, includes retrieval of an input image stored in a first storage space in a memory. The input image is partitioned into a plurality of blocks. A header section is generated comprising a sequence of header bits having a first number of bits for a first block of the plurality of blocks based on application of a sequential encoding scheme on the first block. The header section in which the sequence of header bits may indicate a coding type, a transform type, a prediction type, and a QP value selected in the sequential encoding scheme, is encoded. The selected QP value may be encoded by variable length coding to reduce the first number of bits to a second number of bits in the encoded header section.

16 Claims, 5 Drawing Sheets

VARIABLE LENGTH CODING OF HEADER DATA FOR IMAGE COMPRESSION

CROSS-REFERENCE TO RELATED APPLICATIONS/INCORPORATION BY REFERENCE

None.

FIELD

Various embodiments of the disclosure relate to image compression technologies. More specifically, various embodiments of the disclosure relate to an image-processing apparatus and method for variable length coding of header data for enhanced image compression.

BACKGROUND

Recent advancements in the field of image compression and decompression have led to the development of various codecs to encode and decode digital image data and videos. Typically, a codec, such as an encoder, may compress an image before transmitting the compressed image to a decoder for decompression. The encoder may utilize various lossless or lossy image or video compression techniques to generate the encoded bit stream that may be transmitted, over a communication channel, to the decoder. The encoder may further transmit an encoded header data in the encoded bit stream to the decoder. The encoded header data may include a number of encoded bits that corresponds to a number of decoding parameters, which are required for decompression of the compressed image by the decoder. However, in certain scenarios, where a plurality of different coding techniques are used for compression, the amount of header data may also increase to accommodate information of the plurality of different coding techniques. Thus, in such scenarios, it may be difficult to manage the number of bits in the encoded header data to efficiently store and transmit the encoded header data to the decoder. In scenarios where number of bits in the encoded header data and other encoded data of the compressed image is not managed efficiently, the compression and decompression processes may require high storage space and high memory access bandwidth, which may not be desirable. For example, the processes of storing and retrieving the compressed image, during the compression and decompression, may occur multiple times, and as a result, may consume a large amount of the memory storage and bandwidth. Such consumption of large amount of the memory storage and bandwidth may decrease the operating speed of the codecs during the various processes of the compression and decompression. Therefore, an improved implementation of the codecs may be desired.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus and method for variable length coding of header data for image compression is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
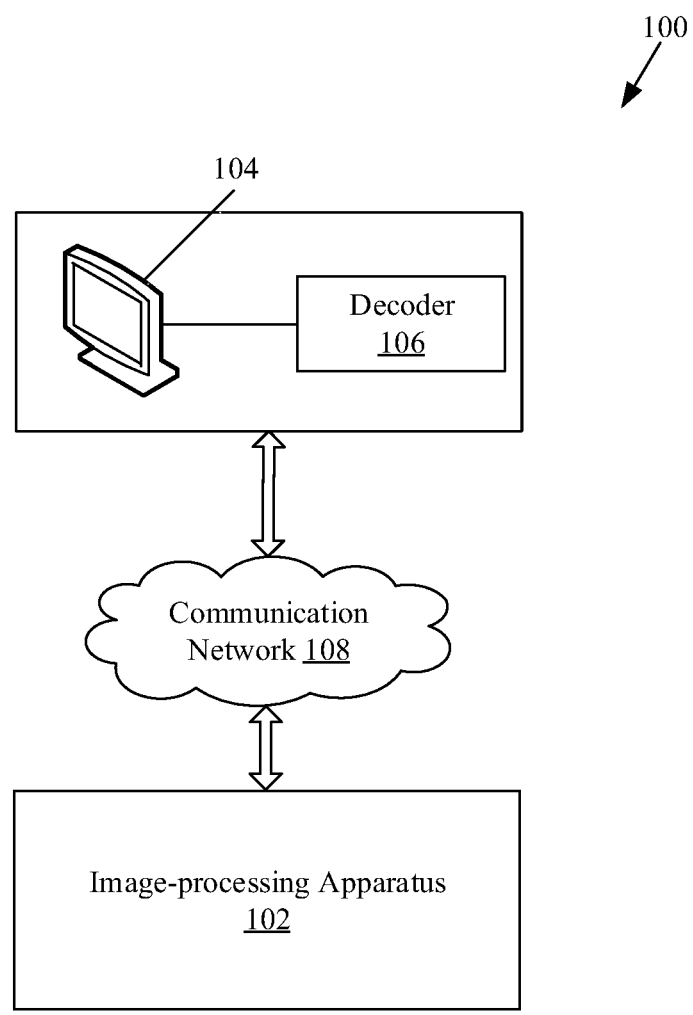
FIG. 1 is a block diagram that illustrates an exemplary network environment for variable length coding of header data for image compression, in accordance with an embodiment of the disclosure.

The following described implementations may be found in the disclosed image-processing apparatus and method for variable length coding of header data for image compression. Exemplary aspects of the disclosure may comprise a method for variable length coding of header data for image compression implemented in an image-processing apparatus that may include a memory and one or more circuits. The memory may be configured to store an input image transmissible from the image-processing apparatus to a display device, via a communication channel, in a first time period. The one or more circuits may be configured to partition the stored input image into a plurality of blocks. The one or more circuits may further generate a header section for a first block of the plurality of blocks. The header section may comprise a sequence of header bits having a first number of bits. The header section for the first block may be generated based on application of a sequential encoding scheme on the first block to generate an encoded first block. The application of the sequential encoding scheme is based on a selection of a transform type, a prediction type, a quantization parameter (QP), and a coding type to signal whether a transform is used or not for the first block. The one or more circuits may further encode the header section in which the sequence of header bits may indicate the coding type, the transform type, the prediction type, and the QP value selected in the sequential encoding scheme applied on the first block. The at least selected QP value may be encoded by variable length coding to reduce the first number of bits to a second number of bits in the encoded header section of the first block. Based on encoding of the selected QP value by variable length coding, the encoded first block may be transmitted, via the communication channel, in a reduced second time period.

In accordance with an embodiment, the sequential encoding scheme may have different coding architectures. For example, the sequential encoding scheme may comprise a sequential application of transform coding by the selected transform type, followed by quantization coding by the selected QP, predictive coding by the selected prediction type, and entropy coding to generate the encoded first block.

The one or more circuits may be configured to execute transform coding on pixel values of the first block. The transform coding may be executed based on the transform type selected from a row-based one-dimensional transform and a column-based one-dimensional transform to generate transformed coefficients of the first block. The one or more circuits may be configured to execute quantization coding on the transformed coefficients of the first block. The quantization coding may be executed based on the QP value selected from a defined set of QP values to generate quantized-transformed coefficients of the first block. The one or more circuits may be configured to execute predictive coding on the quantized-transformed coefficients of the first block. The predictive coding may be executed based on the prediction type selected from a DC-only based prediction and an all-frequency-based prediction to generate quantized-transformed residual levels of the first block. The one or more circuits may be configured to execute entropy coding on the quantized-transformed residual levels of the first block. The entropy coding may include encoding of the DC component of the first block by, by using fixed and/or variable length code, for example. The entropy coding may further include encoding of alternating current (AC) components of the first block by Huffman table-based encoding and/or Exponential-Golomb encoding to generate the encoded first block.

In accordance with an embodiment, the selected QP value of the first block may be encoded by variable length coding during encoding of the header section when pixel values of the first block correspond to luminance component. In some embodiment, the one or more circuits may be configured to jointly encode the selected coding type, the selected transform type, the selected prediction type, and the selected QP value by variable length coding. The selected coding type, the selected transform type, the selected prediction type, and the selected QP value may be jointly encoded during encoding of the header section when pixel values of the first block correspond to chrominance component. The one or more circuits may be further configured to signal the encoded header section of the first block in the encoded first block, to a decoder that receives the encoded first block for decompression.

Another exemplary aspect of the disclosure may comprise an image-processing apparatus and method for image decompression. Exemplary aspects of the disclosure may comprise a method for decoding an encoded header data implemented in an image-processing apparatus that may include a memory and one or more circuits. The one or more circuits may be configured to receive an encoded first block that comprises an encoded header section of a first block of a plurality of blocks of an image, from an encoder. The encoded header section of the first block may be decoded by the one or more circuits, to retrieve a coding type, a transform type, a prediction type, and a QP value used for encoding of the first block by the encoder. The one or more circuits may be further configured to decode the encoded first block by application of a sequential decoding scheme, based on an inverse operation of the retrieved coding type, the prediction type, the QP value, and the transform type. The one or more circuits may further control display of the image on a display screen based on at least decoding of the first block and other blocks of the image.

FIG. 1 is a block diagram that illustrates an exemplary network environment for variable length coding of header for image compression, in accordance with an embodiment of the disclosure. With reference to FIG. 1, there is shown an exemplary network environment 100. The exemplary network environment 100 may include an image-processing apparatus 102. The exemplary network environment 100 may further include a display device 104, which may include a decoder 106. With reference to FIG. 1, there is further shown a communication network 108. The image-processing apparatus 102 and the display device 104 may be communicatively coupled with each other, via the communication network 108.

The image-processing apparatus 102 may comprise suitable logic, circuitry, interfaces, and/or code that may be configured to process digital image data and/or videos that are yet to be compressed. The image-processing apparatus 102 may be configured to encode the digital image data and/or videos, such as a digital image, to generate an encoded bit stream. The image-processing apparatus 102 may be further configured to generate a header section based on the generated encoded bit stream, in which at least a portion of the generated header section is encoded by variable length coding. The image-processing apparatus 102 may be further configured to transmit the encoded header section in the encoded bit stream to the decoder 106 for decompression. Examples of the image-processing apparatus 102 may include, but are not limited to, a digital camera, an image sensor, a personal computer, a laptop computer, a computer workstation, a mainframe computer, a handheld computer, a cellular/mobile telephone, a smart appliance, a gaming console, a digital camcorder, a camera phone, a video player, a digital video disc (DVD) writer/player, a television, and/or an endoscopic device.

The display device 104 may comprise suitable logic, circuitry, interfaces, and/or code that may be configured to receive the encoded bit stream of the digital image from the image-processing apparatus 102, via the communication network 108. The decoder 106 of the display device 104 may be configured to decode the received encoded bit stream based on decoding of the encoded header section, to retrieve the digital image. The display device 104 may be configured to render the decoded digital image. In an exemplary scenario, the display device 104 may be associated with various devices, such as, but not limited to, a digital camera, an image sensor, an endoscopic device, personal computer, a laptop computer, a computer workstation, a mainframe computer, a handheld computer, a personal digital assistant, a cellular/mobile telephone, a smart appliance, a gaming console, a digital camcorder, a camera phone, a video player, a DVD writer/player, and/or a television.

The decoder 106 may comprise suitable logic, circuitry, interfaces, and/or code that may be configured to decode encoded bit stream of the digital image, received from the image-processing apparatus 102. The encoded bit stream of the digital image may be decoded based on decoding of the encoded header section, to generate the digital image. A person ordinary skilled in the art will understand that the decoder 106 may be implemented in the image-processing apparatus 102, without deviation from the scope of the disclosure. In such a scenario, the display device 104 may be directly coupled to the image-processing apparatus 102. Alternatively stated, the image-processing apparatus 102 and the decoder 106 may be implemented as a single codec.

The communication network 108 may include a communication medium through which the image-processing apparatus 102 may communicate with the display device 104 and/or the decoder 106. The communication network 108 may be a wired or wireless communication channel or network. Examples of the communication network 108 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the image-processing apparatus 102 may be configured to receive digital image data and/or videos, such as an input image, from an external electronic device (not shown), via the communication network 108. In some embodiment, the input image may be captured by an image-capture device (not shown) integrated with the image-processing apparatus 102. The image-processing apparatus 102 may store the received input image in a first storage space having a first storage access bandwidth. A storage access bandwidth of an image may correspond to a bandwidth that may be required to access a storage space in the image-processing apparatus 102. For example, the first storage access bandwidth of the input image may correspond to "1 megabyte per second" to access the first storage space in the image-processing apparatus 102. The received input image may be transmissible from the image-processing apparatus to the display device 104 in a first time period, via the communication network 108.

The image-processing apparatus 102 may be configured to partition the stored input image into a plurality of blocks. The stored input image may be partitioned into the plurality of blocks based on a size of a block. The size of the block may be determined based on a pre-defined value, such as "8×8 pixel" block. The size of the block size is defined in both encoder and decoder side. Each block of the plurality of blocks may comprise a plurality of pixels. Number of pixels in each block may be determined based on the size of the block. Each pixel in the block may be further represented by a defined number of bits, such as a sequence of eight bits. Further, each pixel of the plurality of pixels may include multiple color components such as a luminance component and a chrominance component in case of "YUV" input image format.

In accordance with an embodiment, the image-processing apparatus 102 may be configured to select a block, such as a first block, from the plurality of blocks of the stored input image. After the selection of the first block, the image-processing apparatus 102 may be configured to apply a sequential encoding scheme to the first block to generate an encoded first block that comprises an encoded bit stream of the first block. The sequential encoding scheme may have different coding architectures. An example of the sequential encoding scheme is a sequential application of transform coding, followed by quantization coding, predictive coding, and entropy coding. The application of the sequential encoding scheme may be further based on a selection of a transform type, a QP value, a prediction type, and a coding type for the first block.

The image-processing apparatus 102 may be configured to execute transform coding on the first block to generate transformed coefficients of the first block. The transform coding on the first block may be executed based on the transform type selected from a row-based one-dimensional transform and a column-based one dimensional transform. In an exemplary embodiment, the transform type may correspond to a forward transform. In such scenario, the transform coding of the first block may be executed based on a forward transform type selected from a row-based forward one-dimensional transform or a column-based one-dimensional forward transform. Based on the application of the transform coding on pixel values of the first block, the first block may be transformed into frequency domain represented by the transformed coefficients. The generation of the transformed coefficients has been described in detail, for example, in FIG. 2.

The image-processing apparatus 102 may be configured to execute quantization coding on the transformed coefficients of the first block to generate quantized-transformed coefficients of the first block. The image-processing apparatus 102 may control quantization coding of the transformed coefficients of the first block based on the QP value selected from a defined set of QP values. The generation of the quantized-transformed coefficients has been described in detail, for example, in FIG. 2.

The image-processing apparatus 102 may then execute predictive coding on the quantized-transformed coefficients of the first block to generate quantized-transformed residual levels of the first block. The predictive coding of the first block may be executed based on the prediction type selected from a DC-only based prediction and all-frequency-based prediction. In an exemplary embodiment, the prediction type may correspond to a differential pulse-code modulation (DPCM). In such scenario, the predictive coding of the first block may be executed based on the prediction type selected from a DC-only DPCM or all-frequency DPCM. In cases where the DC-only DPCM type is selected, only DC coefficients of the transformed coefficients are predicted from the DC coefficients of neighboring coefficients. In cases where all-frequency based prediction is used, both DC and AC frequencies are predicted from the neighboring DC and AC coefficients. The generation of the quantized-transformed residual levels has been described in detail, for example, in FIG. 2.

The image-processing apparatus 102 may be configured to further encode the quantized-transformed residual levels of the first block to generate the encoded first block. The encoded first block may correspond to the encoded bit stream of the first block. The encoded bit stream of the first block may be generated by entropy coding on the quantized-transformed residual levels of the first block. The entropy coding may be done by different coding types that are selected to signal whether a transform is used or not for the first block. In an exemplary embodiment, if the transform is not used, a special coding type called Pulse-Code-Modulation (PCM) is used. In cases where transform is used, the DC component of the quantized-transformed residual levels may be encoded by either fixed length or variable length code, whereas the AC components of the quantized-transformed residual levels may be encoded by at least one of Huffman table-based coding, Exponential-Golomb coding, conditional Golomb coding, Universal coding, Unary coding, Arithmetic coding, and/or the like. The generation of the encoded bit stream of the first block has been described in detail, for example, in FIG. 2.

The image-processing apparatus 102 may be further configured to generate a header section for the first block. The header section may comprise a sequence of header bits having a first number of header bits. The header section for the first block may be generated based on the sequential encoding scheme applied on the first block to generate the encoded first block. For example, the header section may be generated based on the selected transform type, the selected QP value, the selected prediction type, and the selected coding type that are used during the transform coding, quantization coding, predictive coding, and entropy coding of the first block, respectively.

The image-processing apparatus 102 may be further configured to encode the generated header section in which the sequence of header bits may indicate the selected transform type, the selected QP value, the selected prediction type, and the selected coding type. In an exemplary embodiment, the selected QP value may be encoded by variable length coding. The selected QP value used for the quantization of the first block may be encoded by variable length coding during the encoding of the generated header section when the pixel values of the first block correspond to the luminance component. In such exemplary scenario, the selected transform type, the selected prediction type, and the selected coding type in the generated header section may be encoded by other coding types, for example, fixed length coding. In another exemplary embodiment, the image-processing apparatus 102 may be configured to jointly encode the selected transform type, the selected QP value, the selected prediction type, and the selected coding type by variable length coding. The selected transform type, the selected QP value, the selected prediction type, and the selected coding type may be jointly encoded by variable length coding in a case where the pixels values of the first block correspond to the chrominance component. Such process of encoding the generated header section by variable length coding may reduce the first number of bits to a second number of bits in the encoded header section. Thus, the generated header section may require a reduced storage space with reduced storage access bandwidth, and further, may be transmitted to the decoder 106 in a reduced time period.

The image-processing apparatus 102 may be configured to transmit the generated encoded first block to the decoder 106, via the communication network 110. In accordance with an embodiment, the encoded header section of the first block may be further signaled in the generated encoded first block in an encoded form, to the decoder 106 that receives the encoded first block for decompression. Similar to the generation of the encoded bit stream and the encoded header section of the first block, the image-processing apparatus 102 may be configured to generate the encoded bit stream and the encoded header section of each of the remaining plurality of blocks of the stored input image. Further, the generated encoded bit stream with the encoded header section of the remaining plurality of blocks may be transmitted to the decoder 106 for the decompression of the remaining plurality of blocks.

The decoder 106 may be configured to receive the encoded first block and the encoded header section of the first block from the image-processing apparatus 102, via the communication network 108. The encoded header section of the first block may be decoded by the decoder 106, to retrieve the transform type, the QP value, the prediction type, and the coding type that have been used for encoding the first block. Based on the retrieved transform type, the retrieved QP value, the retrieved prediction type, and the retrieved coding type, the decoder 106 may decode the encoded first block based on an inverse operation. The inverse operation may be executed based on a sequential decoding scheme. The sequential decoding scheme may comprise, for example, a sequential application of entropy decoding based on the retrieved coding type, followed by DPCM prediction based on the retrieved prediction type, inverse quantization based on the retrieved QP value, and inverse transform based on the retrieved transform type. Similar to decoding of the encoded first block, the decoder 106 may further decode the remaining plurality of encoded blocks to control display of the image on the display device 104.

Figure 2:
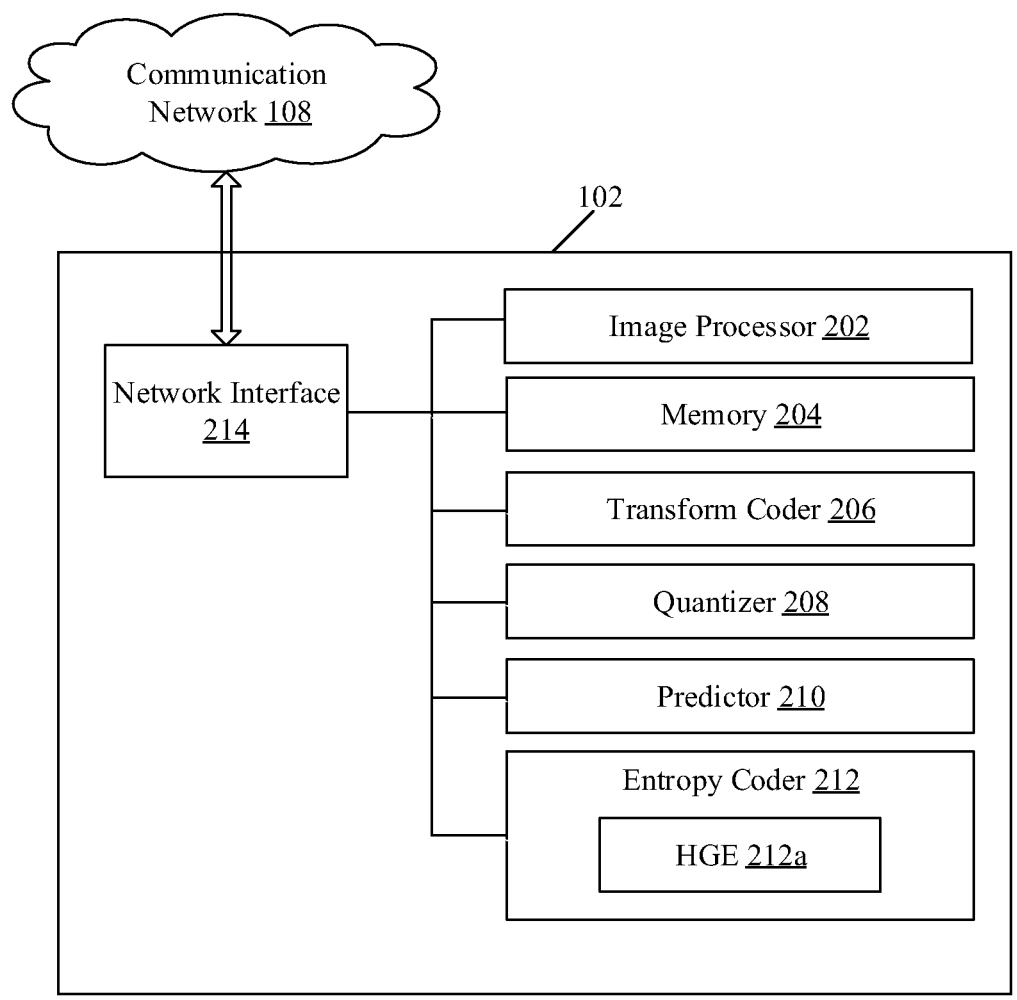
FIG. 2 is a block diagram that illustrates an exemplary image processing apparatus for variable length coding of header data for image compression, in accordance with an embodiment of the disclosure.

FIG. 2 is a block diagram that illustrates an exemplary image processing apparatus for variable length coding of header for image compression, in accordance with an embodiment of the disclosure. FIG. 2 is explained in conjunction with elements from FIG. 1. With reference to FIG. 2, there is shown a block diagram of an exemplary image-processing apparatus, such as the image-processing apparatus 102. The image-processing apparatus 102 may include one or more circuits, such as an image processor 202, a memory 204, a transform coder 206, a quantizer 208, a predictor 210, and an entropy coder 212. The entropy coder 212 may include a header generator and encoder (HGE) 212a. The image-processing apparatus 102 may further include network interface 214. With reference to FIG. 2, there is further shown the communication network 108 (FIG. 1).

In accordance with an embodiment, the image processor 202 may be communicatively coupled to the memory 204, the transform coder 206, the quantizer 208, the predictor 210, the entropy coder 212, the HGE 212a, and the network interface 214. The network interface 214 may be configured to communicate with the display device 104 and the decoder 106, via the communication network 108, under the control of the image processor 202.

The image processor 202 may comprise suitable logic, circuitry, interfaces, and/or code that may be configured to execute a set of instructions stored in the memory 204. The image processor 202 may be configured to receive digital image data and/or videos, such as an input image, from an external electronic device or the image-capture device integrated with the image-processing apparatus 102. The image processor 202 may partition the input image into a plurality of blocks. The image processor 202 may be further configured to instruct the transform coder 206, the quantizer 208, the predictor 210, and the entropy coder 212, to generate an encoded bit stream of the plurality of blocks. The image processor 202 may be further configured to instruct the HGE 212a to generate an encoded header section of each of the plurality of blocks. The image processor 202 may be implemented based on a number of processor technologies, which are known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The memory 204 may comprise suitable logic, circuitry, interfaces, and/or code that may be configured to store the received input image. The memory 204 may be further configured to store a set of instructions executable by the image processor 202, the transform coder 206, the quantizer 208, the predictor 210, the entropy coder 212, and/or the HGE 212a to generate the encoded bit stream. The memory 204 may be further configured to store operating systems and associated applications of the image-processing apparatus 102. Examples of implementation of the memory 204 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), a Secure Digital (SD) card, flash drive, cache memory, and/or other non-volatile memory.

The transform coder 206 may comprise suitable logic, circuitry, interfaces, and/or code that may be configured to execute transform coding on each of the plurality of blocks of the input image stored in the memory 204. The execution of transform coding on a block of the plurality of blocks may transform pixel data of the block to frequency domain. The transformed pixel data of the block may be referred to as transformed coefficients. The transform coding may be executed by a forward transform, such as one or two dimensional forward discrete cosine transform (FDCT). The transform coder 206 may be implemented as the ASIC or the FPGA.

The quantizer 208 may comprise suitable logic, circuitry, interfaces, and/or code that may be configured to execute quantization coding on the transformed coefficients of the block. The quantization coding may be executed on the transformed coefficients of the block based on one or more QP values, to generate quantized-transformed coefficients of the block.

The predictor 210 may comprise suitable logic, circuitry, interfaces, and/or code that may be configured to execute predictive coding on the quantized-transformed coefficients of the block. The predictive coding may refer to DC-only DPCM or all-frequency DPCM, to compute DPCM for each of the quantized-transformed coefficients. The predictor 210 may be implemented on an ASIC or FPGA. In an exemplary embodiment, the quantizer 208 may be implemented on the same ASIC as the predictor 210.

The entropy coder 212 may comprise suitable logic, circuitry, interfaces, and/or code that may be configured to execute entropy coding on quantized-transformed residual levels of the block. The entropy coding may be executed on the quantized-transformed residual levels of the block by application of different coding types, to generate an encoded bit stream of the block. The different coding techniques may correspond to, but are not limited to, fixed-length coding, Huffman table-based coding, Exponential-Golomb coding, conditional Golomb coding, Universal coding, Unary coding, and Arithmetic coding. The entropy coder 212 may be implemented as the ASIC or the FPGA.

The HGE 212a may comprise suitable logic, circuitry, interfaces, and/or code that may be configured to generate a header section for the block based on the applied sequential encoding scheme on the block. In an exemplary embodiment, the HGE 212a may be implemented on the same ASIC as the entropy coder 212. The HGE 212a may be implemented as a separate circuit or special-purpose circuitry in the image-processing apparatus 102, as shown. The HGE 212a and the entropy coder 212 may be implemented as an integrated circuit or a cluster of circuits that perform the functions of the HGE 212a and the entropy coder 212.

The network interface 214 may comprise suitable logic, circuitry, interfaces, and/or code that may be configured to communicate with the display device 104 (as shown in FIG. 1), via the communication network 108 (as shown in FIG. 1). The network interface 214 may be implemented by application of known technologies to support wired or wireless communication of the image-processing apparatus 102 with the communication network 108. Components of the network interface 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the image processor 202 may be configured to receive digital image data and/or videos, such as an input image, from the external device (not shown), via the communication network 108. In some embodiments, the input image may be captured by a camera, such as the image-capture device, integrated with the image-processing apparatus 102. In some other embodiments, the input image may be extracted from a repository, via the communication network 108, based on an instruction provided by a user (not shown) associated with the image-processing apparatus 102. Further, the image processor 202 may be configured to store the received input image in a first storage space having a first storage access bandwidth in the memory 204. The first storage access bandwidth may also be referred to as a memory access bandwidth.

The image processor 202 may be configured to partition the stored input image into a plurality of blocks. The stored input image may be partitioned into the plurality of blocks based on a defined value of a size of a block, retrieved from the memory 204, such as, "8×8 pixel" block. In another example, the size of the block may be determined in real time or near-real time based on a current available bandwidth of the communication network 108. Alternatively, the size of the block may correspond to a value provided by the user in real time or near-real time. For example, if the input image is of size, "32×32", and the defined value of size of block is "8×8", the image processor 202 may partition the input image into "4 blocks". In accordance with an embodiment, each of the plurality of blocks may comprise a plurality of pixels, and each of the plurality of pixels may be represented by a defined number of bits, referred to as a bit depth. For example, if each pixel of the block is represented by eight bits, the bit depth may be a value "8". Further, each pixel of the plurality of pixels may include a luminance component and a chrominance component.

For the sake of brevity, the ongoing description has been described with reference to a single block, for example, a first block selected from the plurality of blocks of the input image. However, the scope of the disclosure is not limited to the single block of the input image. Similar to the encoding processes executed on the first block, other blocks of the plurality of blocks of the input image may be processed to generate an encoded bit stream.

The image processor 202 may be configured to communicate the first block to the transform coder 206. The transform coder 206 may be configured to execute transform coding on the first block by a forward transform, to transform the first block into frequency domain. For example, the transform coding of the first block may be executed by one dimensional (1D) FDCT (for example, selected from row-based 1D FDCT or column-based 1D FDCT) to obtain transformed coefficients of the first block. Alternatively, the transform coding of the first block may be executed by two dimensional (2D) FDCT. The transformed coefficients of the first block may include a DC value. For example, if 8×8 2D FDCT is executed, a first transform coefficient in the transformed coefficients of the first block may correspond to the DC value, which is an integer value. The remaining transformed coefficients in the transformed coefficients of the first block other than the DC value may correspond to AC values. For example, in a 8×8 block, if two dimensional 8×8 forward transform is executed, the first coefficient is the DC value (at coordinates 0,0 of the 8×8 block), followed by 63 AC values. Both DC and AC values can be non-zero and/or zero values.

The transform coder 206 may be configured to communicate the transformed coefficients of the first block to the quantizer 208. The quantizer 208 may be configured to execute quantization coding on the transformed coefficients of the first block. The quantization coding may be executed on the transformed coefficients of the first block based on a QP value selected from a defined set of QP values, for example, "0" to "7". The QP value may be selected from the defined set of QP values based on a degree of compression that has to be achieved in the encoded bit stream. In another example, the QP value may be selected from the defined set of QP values based on block content in the first block, such as pixel values associated with the first block. In yet another example, the QP value may be selected from the defined set of QP values based on a current available bandwidth of the communication network 108 via which the encoded bit stream may be transmitted to the decoder 106. The QP value may further be selected from the defined set of QP values based on the forward transform coefficients of the first block. The quantizer 208 may be further configured to compute a quantization step based on the QP value selected from the defined set of QP values. Thereafter, the transformed coefficients of the first block may be quantized by application of the quantization coding, based on the computed quantization step. In order to avoid floating point operation, the quantizer 208 may use the selected QP value directly without computing quantization step to execute quantization coding on the transformed coefficients of the block. The quantization of the transformed coefficients of the first block may generate quantized-transformed coefficients of the first block.

For transform coding based on the 2D FDCT by the transform coder 206, the execution of the predictive coding based on the DPCM by the predictor 210, may be skipped. In such exemplary scenario, the quantizer 208 may be configured to communicate the quantized-transformed coefficients of the first block to the entropy coder 212. However, for transform coding based on the 1D FDCT by the transform coder 206, the quantizer 208 may be configured to communicate the quantized-transformed coefficients of the first block to the predictor 210. The predictor 210 may be configured to execute predictive coding, such as the DPCM, on the quantized-transformed coefficients of the first block. The predictor 210 may select a prediction type from a DC-only DPCM and an all-frequency DPCM, to compute DPCM for each of the quantized-transformed coefficients of the first block. Based on the computed DPCM for each of the quantized-transformed coefficients of the first block, the predictor 210 may be configured to determine quantized-transformed residual levels of the first block.

The predictor 210 may be configured to communicate the quantized-transformed residual levels of the first block to the entropy coder 212. The entropy coder 212 may be configured to execute entropy coding on the quantized-transformed residual levels of the first block to generate an encoded first block that comprises the encoded bit stream of the first block. The entropy coding may be executed by different coding types. The different coding types may be selected based on the DC component and the AC components associated with the first block. In an embodiment, the DC component of the quantized-transformed residual levels may be encoded by PCM-based coding. Further, the AC components of the quantized-transformed residual levels may be encoded by Huffman table-based coding, Exponential-Golomb coding, conditional Golomb coding, Universal coding, Unary coding, Arithmetic coding, and/or the like.

In an exemplary scenario, the entropy coder 212 may execute entropy coding based on a category map and an end-of-block (EOB) code. The entropy coder 212 may classify each of quantized-transformed residual levels of the first block into a plurality of categories. The quantized-transformed residual levels may be classified into the plurality of categories based on an absolute value of each of the quantized-transformed residual levels and one or more threshold values. For simplicity of discussion, consider two categories, for example, a first category and a second category, and one threshold value, for example, "5." Based on the absolute value of a quantized-transformed residual level that is less than or equal to the threshold value, the entropy coder 212 may classify the quantized-transformed residual levels in the first category. Based on the absolute value of the quantized-transformed residual levels being greater than the threshold value, the entropy coder 212 may classify the quantized-transformed residual levels in the second category. Based on the classification, the entropy coder 212 may generate the category map of the quantized-transformed residual levels of the first block. The generated category map may indicate a category and a position of each of the quantized-transformed residual levels of the first block. Further, the entropy coder 212 may be configured to encode the generated category map to generate an encoded bit stream of the category map. Thereafter, considering that the quantized-transformed residual levels of the first block corresponds to a 2D quantized-transformed residual levels, the entropy coder 212 may scan the quantized-transformed residual levels of the first block to generate 1D quantized-transformed residual levels of the first block. The quantized-transformed residual levels of the first block may be scanned by application of a first scanning pattern to generate the 1D quantized-transformed residual levels of the first block. The first scanning pattern may correspond to a scan order, in which the quantized-transformed residual levels are scanned to arrange the quantized-transformed residual levels into an ordered sequence of the 1D quantized-transformed residual levels. The entropy coder 212 may be further configured to estimate a position of a first non-zero residual levels in the generated 1D quantized-transformed residual levels of the first block. The position of the first non-zero residual level may be estimated by application of a second scanning pattern on the generated 1D quantized-transformed residual levels of the first block. The second scanning pattern may be reverse of the first scanning pattern. The entropy coder 212 may further quantize the estimated position of the first non-zero residual level based on a defined value to obtain a quantized value of the estimated position. The entropy coder 212 may further append the EOB code in the generated 1D quantized-transformed residual levels of the first block to obtain a modified 1D quantized-transformed residual levels. The EOB code may be appended at a position that is subsequent to the estimated position of the first non-zero residual level in the generated 1D quantized-transformed residual levels. Further, the EOB code may be appended at the position that is subsequent to the estimated position of the first non-zero residual level, after removal of zero bit values read from the second scanning pattern to the estimated position.

The entropy coder 212 may further encode the quantized-transformed residual levels in the modified 1D quantized-transformed residual levels of the first block to generate the encoded first block. The quantized-transformed residual levels in the modified 1D quantized-transformed residual levels may be encoded by different coding types, based on the classification of the quantized-transformed residual levels into the first category and the second category. The first category and the second category of the quantized-transformed residual levels in the modified 1D quantized-transformed residual levels may be encoded, by application of different coding types, to generate the encoded first block. The different coding types may include fixed length encoding, Huffman encoding, and Exponential-Golomb. The entropy coder 212 may select a plurality of coding techniques from the different coding types to encode the quantized-transformed residual levels of the first block. For example, the DC component of the quantized-transformed residual levels may be encoded by either fixed length or variable length encoding. The first category of the quantized-transformed residual levels may be encoded by application of the Huffman encoding, based on one or more defined Huffman tables. The one or more defined Huffman tables may be selected based on the position of the quantized-transformed residual levels in the generated category map. The second category of the quantized-transformed residual levels may be encoded by use of the Exponential-Golomb encoding.

A person of ordinary skill in the art will understand that the scope of the disclosure is not limited to the classification of the quantized-transformed residual levels prior to the generation of the modified 1D quantized-transformed residual levels of the first block. The quantized-transformed residual levels of the first block may be classified into the plurality of categories after the generation of the modified 1D quantized-transformed residual levels of the first block, without deviation from the scope of the disclosure. Alternatively, the generation of the modified 1D quantized-transformed residual levels may be independent of the classification of the quantized-transformed residual levels.

Based on the generation of the encoded first block, the HGE 212a may be configured to generate a header section for the first block. The header section may comprise a sequence of header bits. The sequence of header bits may include a certain count of bits, referred to as a first number of header bits. The header section for the first block may be generated based on the sequential encoding scheme applied on the first block to generate the encoded first block. For example, the header section may be generated to indicate at least the transform type, the QP value, the prediction type, and the coding type that are selected during the application of the sequential encoding scheme on the first block. The HGE 212a may further encode the generated header section in which the sequence of header bits may indicate the selected transform type, the selected QP value, the selected prediction type, and the selected coding type. In an exemplary embodiment, the selected QP value in the generated header section may be encoded by variable length coding. The selected QP value used for the quantization of the first block may be encoded by variable length coding based on the pixels values of the first block that correspond to the luminance component. In such exemplary scenario, the selected transform type, the selected prediction type, and the selected coding type in the generated header section may be encoded by other coding types, for example, fixed length coding. In another exemplary embodiment, the HGE 212a may be configured to jointly encode at least the selected transform type, the selected QP value, the selected prediction type, and the selected coding type by variable length coding. The selected transform type, the selected QP value, the selected prediction type, and the selected coding type may be jointly encoded by variable length coding when the pixels values of the first block correspond to the chrominance component. The encoding of the generated header section by variable length coding may reduce the first number of bits to a second number of bits in the encoded header section. As a result, the storage space to store the encoded header section may be saved.

The entropy coder 212 may be configured to transmit the encoded first block to the decoder 106, via the communication network 110. In accordance with an embodiment, the encoded header section of the first block may be further signaled in encoded form in the generated encoded first block, to the decoder 106 that receives the encoded first block for decompression. Further, in scenario where the entropy coding is based on the category map and/or the EOB code, the entropy coder 212 may signal the generated category map of the first block in encoded form and the encoded quantized value of the estimated position to the decoder 106 in the header section.

Based on the reduced second number of bits in the encoded header section of the first block, the entropy coder 212 may transmit the encoded first block that includes at least the encoded header section, to the decoder 106 in a reduced second time period as compared to a time period that may have been required if the encoded first block included at least the encoded header section, where variable length coding may not have been applied during encoding of a portion of the header section. Further, the encoded first block that includes the encoded header section may be storable in a reduced second storage space having a reduced second storage access bandwidth in the memory 204. Similar to the generation of the encoded bit stream and the encoded header section of the first block, the image-processing apparatus 102 may be configured to generate the encoded bit stream for each of the remaining plurality of blocks of the stored input image. Further, the generated encoded bit stream along with the encoded header section of the remaining plurality of blocks may be transmitted to the decoder 106 for the decompression of the respective remaining plurality of blocks.

Figure 3A:
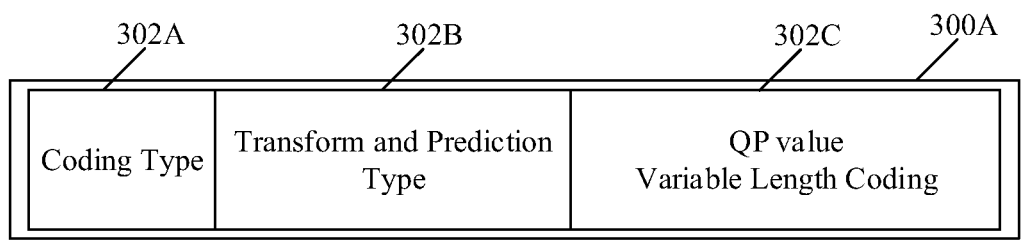
FIG. 3A is a block diagram that illustrates an exemplary scenario for variable length coding of header data for image compression, in accordance with an embodiment of the disclosure.

FIG. 3A is a block diagram that illustrates an exemplary scenario for variable length coding of header data for image compression, in accordance with an embodiment of the disclosure. FIG. 3A is described in conjunction with elements from FIG. 1 and FIG. 2. With reference to FIG. 3A, a header section 300A for a block, for example, a first block of a plurality of blocks of an input image is illustrated. The header section 300A may be generated by HGE 212a, in a case where the pixel values of the first block correspond to luminance component. In such scenario, the header section 300A may include a plurality of sections, such as a first section 302A, a second section 302B, and a third section, that corresponds to a sequence of header bits having a first number of bits.

The first section 302A may indicate a coding type selected for encoding of the first block. The coding type may be selected to signal whether a transform is used or not to encode the pixels value of the first block. The first section 302A may be associated with a defined number of bits, for example, "1 bit", to indicate forward transform is used or not to encode the first block. If forward transform is not used, a special coding technique called pulse-code-modulation (PCM) is used to encode all of the pixels of the first block. For example, based on the first section 302A having a bit value "1", this may indicate that the PCM-based coding has been used for encoding the first block. Similarly, based on the first section 302A having a bit value "0", this may indicate that forward transform is used to encode all pixels of the first block. Further, in an exemplary embodiment, the coding type in the first section 302A may be encoded by fixed length coding.

The second section 302B may indicate a mode, such as a transform type and a prediction type, selected for transform coding and predictive coding on the first block, respectively. The transform type may be based on FDCT. Thus, the transform type may correspond to one of a row-based FDCT and a column-based FDCT. The prediction type may be based on DPCM. Thus, the prediction type may correspond to one of a DC-only DPCM and an all-frequency DPCM. The second section 302B may be associated with a defined number of bits, for example, "2 bits", to indicate the transform type and the prediction type. Further, in an exemplary embodiment, the transform type and the prediction type in the second section 302B may be encoded by fixed length coding.

The third section 302C may indicate a QP value selected for quantization coding on the first block in compression. The QP value may be selected from a defined set of QP values, for example, "0" to "7". The third section 302C may be associated with a variable number of bits to indicate the selected QP value for quantizing the first block. Further, in an exemplary embodiment, the QP value in the third section 302C may be encoded by variable length coding to enable signaling of QP in variable number of bits in the header section 300A. The third section 302C assign lower number of bit for most likely QP values (i.e. for QP values that have high likelihood of use as compared to remaining QPs) of and large number of bits for less likely QP values (i.e. for QP values that have low likelihood of use as compared to remaining QPs). If the QP value in the third section 302C (a portion of the header section 300A) have been encoded by fixed length coding, for example 3 bits, which may not be desirable. Thus, there may be no need to dedicate a fixed number of bits to the header section 300A as a result of the use of the variable length coding for a certain portion of the header section 300A.

Based on the encoding of the first section 302A, the second section 302B, and the third section 302C in the header section 300A, the HGE 212a may generate an encoded header section that comprises a second number of bits, for example total 5 bits, that is less than the first number of bits (more than 5 bits). The sequence of header bits in the encoded header section may indicate the coding type, the transform type, the prediction type, and the QP value selected in a sequential encoding scheme applied on the first block. Further, the entropy coder 212 may signal the encoded header section along with an encoded bit stream of the first block to the decoder 106 for decompression of the first block.

Figure 3B:
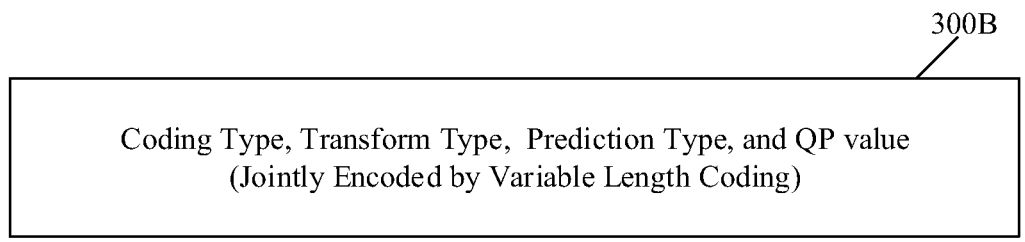
FIG. 3B is a block diagram that illustrates an exemplary scenario for variable length coding of header data for image compression, in accordance with an embodiment of the disclosure.

FIG. 3B is a block diagram that illustrates an exemplary scenario for variable length coding of header for image compression, in accordance with an embodiment of the disclosure. FIG. 3B is described in conjunction with elements from FIG. 1 and FIG. 2. With reference to FIG. 3B, a header section 300B for a block, for example, a first block of a plurality of blocks of an input image is illustrated. The header section 300B may be generated by HGE 212a, in a case where the pixel values of the first block correspond to chrominance component. In such scenarios, the header section 300B may include a sequence of header bits having a first number of bits. The sequence of header bits in the header section 300B may indicate a coding type based on whether to use a transform or not, and a transform type selected for executing transform coding on the first block. The sequence of header bits in the header section 300B may further indicate a prediction type selected for executing predictive coding on the first block and a QP value selected for executing quantization coding on the first block. Further, the sequence of header bits in the header section 300B that indicate the selected coding type, the selected transform type, the selected prediction type, and the selected QP value may be jointly encoded by variable length coding during encoding of the header section 300B.

Based on encoding of the header section 300B by variable length coding, the HGE 212a may generate an encoded header section that comprises a second number of bits that is less than the first number of bits. The sequence of header bits in the encoded header section may indicate the coding type, the transform type, the prediction type, and the QP value selected in a sequential encoding scheme applied on the first block. Further, the entropy coder 212 may signal the encoded header section in an encoded bit stream of the first block to the decoder 106 for decompression of the first block.

Figure 4:
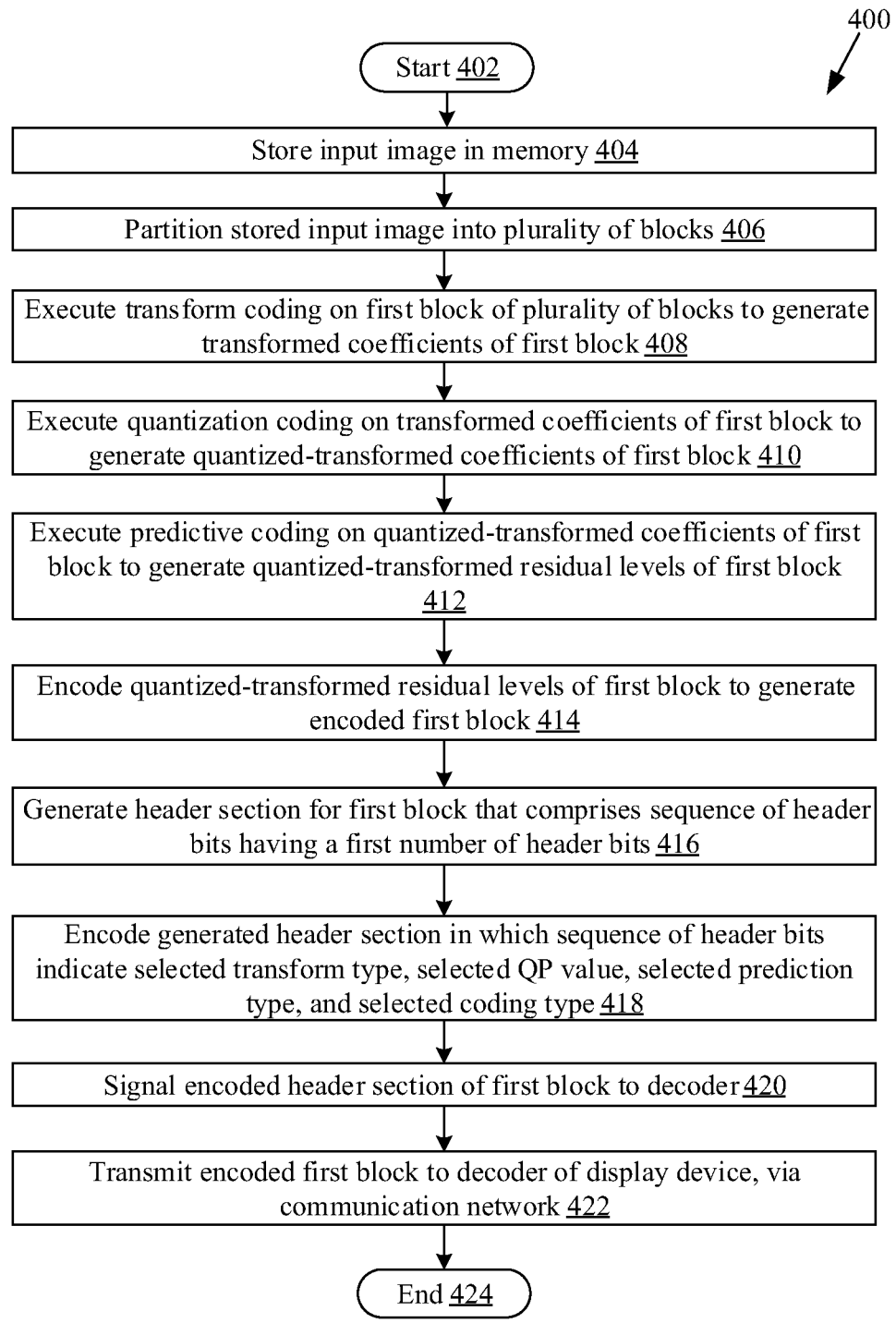
FIG. 4 is a flow chart that illustrates exemplary operations for variable length coding of header data for image compression, in accordance with an embodiment of the disclosure.

FIG. 4 is a flow chart that illustrates exemplary operations for variable length coding of header for image compression, in accordance with an embodiment of the disclosure. With reference to FIG. 4, there is shown a flow chart 400. The flow chart 400 is described in conjunction with, for example, FIGS. 1, 2, 3A, and 3B. The method starts at 402 and proceeds to 404.

At 404, an input image may be stored in the memory 204. The image processor 202 may receive the input image from the external electronic device or the image-capture device that is integrated with the image-processing apparatus 102. The received input image may be stored in a first storage space having a first storage access bandwidth in the memory 204. The received input image may be communicated from the image-processing apparatus 102 to the display device 104, via the communication network 110, in a first time period.

At 406, the stored input image may be partitioned into a plurality of blocks. The image processor 202 may be configured to partition the stored input image into the plurality of blocks. During processing of the stored input image, an image buffer that corresponds to the input image may be temporally stored in the memory 204 for the partition. The stored input image may be partitioned into the plurality of blocks based on a defined value of a size of a block.

At 408, transform coding may be executed on a first block of the plurality of blocks to generate transformed coefficients of the first block. The transform coder 206 may execute transform coding on pixel values of the first block based on a transform type selected from a row-based transform type and a column-based transform type. For example, the transform coding of the first block may be executed by a row-based 1D FDCT or a column-based 1D FDCT, to generate the transformed coefficients of the first block. In another example, the transform coding of the first block may be executed by 2D FDCT.

At 410, quantization coding may be executed on the transformed coefficients of the first block to generate quantized-transformed coefficients of the first block. The quantizer 208 may execute quantization coding on the transformed coefficients of the first block based on a QP value selected from a defined set of QP values. The QP value may be selected from the defined set of QP values, for example, "0" to "51" or "0 to 7", based on a degree of compression, pixel values associated with the first block, and/or a current available bandwidth of the communication network 110.

At 412, predictive coding may be executed on the quantized-transformed coefficients of the first block to generate quantized-transformed residual levels of the first block. The predictor 210 may execute the predictive coding on the quantized-transformed coefficients of the first block based on a prediction type selected from a DC-only based prediction and an all-frequency-based prediction. Each of the prediction type may refer to the DPCM.

At 414, the quantized-transformed residual levels of the first block may be encoded to generate an encoded first block. The encoded first block may be storable in a reduced second storage space having a reduced second storage access bandwidth. The entropy coder 212 may execute entropy coding on the quantized-transformed residual levels of the first block to generate the encoded first block. For example, the entropy coder 212 in association with the predictor 210 may encode the DC component of the first block by using fixed and/or variable length code. Thereafter, the entropy coder 212 may be configured to entropy code the AC components of the first block by Huffman table-based encoding, Exponential-Golomb encoding, Universal coding, Huffman coding, or Arithmetic coding, to generate the encoded first block.

At 416, a header section for the first block may be generated. The header section may comprise a sequence of header bits having a first number of header bits. The HGE 212a may be configured to generate the header section for the first block based on a sequential encoding scheme applied on the first block to generate the encoded first block. The sequential encoding scheme may have different coding architectures. The sequential encoding scheme may comprise, for example, a sequential application of transform coding by the selected transform type, followed by quantization coding by the selected QP, predictive coding by the selected prediction type, and entropy coding to generate the encoded first block. The sequential encoding scheme applied on the first block is described, for example, at 408 to 414. An example of generation of the header section has been shown and described, for example, in FIGS. 3A and 3B.

At 418, the generated header section in which the sequence of header bits may indicate the selected transform type, the selected QP value, the selected prediction type, and the selected coding type, may be encoded. The HGE 212a may be configured to encode the generated header section in which at least the selected QP value is encoded by variable length coding. In an exemplary embodiment, the selected QP value for the quantization of the first block may be encoded by variable length coding based on the pixels values of the first block that correspond to the luminance component. In such scenario, the selected transform type, the selected prediction type, and the selected coding type in the generated header section may be encoded by other coding types, for example, fixed length coding. In another exemplary embodiment, the HGE 212a may be configured to jointly encode the selected transform type, the selected QP value, the selected prediction type, and the selected coding type by variable length coding. The selected transform type, the selected QP value, the selected prediction type, and the selected coding type may be jointly encoded by variable length coding based on the pixels values of the first block that correspond to the chrominance component. The process of encoding the generated header section by variable length coding may reduce the first number of bits in the generated header section to a reduced second number of bits in the encoded header section.

At 420, the encoded header section of the first block may be signaled to the decoder 106, via the communication network 108. The entropy coder 212 may be configured to signal the encoded header section of the first block to the decoder 106.

At 422, the encoded first block that corresponds to the encoded bit stream of the first block may be transmitted to the decoder 106 of the display device 104, via the communication network 108. The entropy coder 212 may transmit the encoded first block to the decoder 106. The encoded header section of the first block may be signaled in the encoded first block, to the decoder 106 that receives the encoded first block for decompression. The entropy coder may be configured to transmit or otherwise communicate the encoded first block that comprises the encoded header section to the decoder 106, via the communication network 110, in a reduced second time period in comparison to the first time period. The control passes to the end 424.

Figure 5:
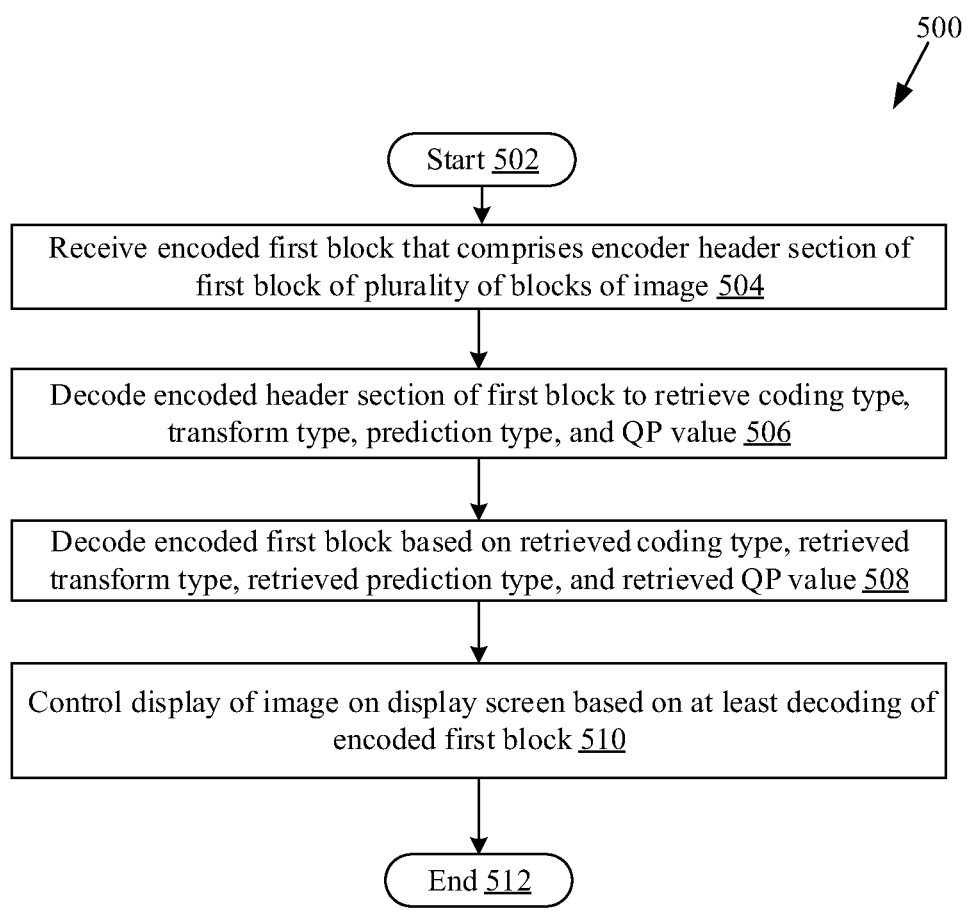
FIG. 5 is a flow chart that illustrates exemplary operations for decoding header data for image decompression, in accordance with an embodiment of the disclosure.

FIG. 5 is a flow chart that illustrates exemplary operations for decoding header data for image decompression, in accordance with an embodiment of the disclosure. With reference to FIG. 5, there is shown a flow chart 500. The flow chart 500 is described in conjunction with, for example, FIGS. 1, 2, 3A, 3B, and 4. The method starts at 502 and proceeds to 504.

At 504, an encoded first block that comprises an encoder header section of a first block of a plurality of blocks of an image may be received. The decoder 106 may be receive the encoded first block comprising the encoder header section of the first block from the image-processing apparatus 102, for example, an encoder, via the communication network 108.

At 506, the encoded header section of the first block may be decoded. The decoder 106 may be configured to decode the encoded header section to retrieve decoding parameters that are required to decode the encoded first block. The decoding parameters may correspond to a coding type, a transform type, a prediction type, and a QP value that have been used to encode the first block by the image-processing apparatus 102.

At 508, the encoded first block may be decoded. The decoder 106 may be configured to decode the encoded first block based on the retrieved decoding parameters. For example, the encoded first block may be decoded based on the coding type, the transform type, the prediction type, and the QP value retrieved from the encoded header section. The decoder 106 may apply a sequential decoding scheme to decode the encoded first block. The sequential decoding scheme may comprise, for example, a sequential application of inverse entropy coding based on the retrieved coding type, followed by DPCM prediction based on the retrieved prediction type, inverse quantization based on the retrieved QP value, and inverse transform based on the retrieved transform type.

At 510, display of the image on the display device 104 may be controlled. The decoder 106 may control the display of the image on the display device 104 based on at least decoding of the encoded first block. Similar to decoding of the encoded first block, the decoder 106 may further decode remaining plurality of encoded blocks to control display of the image on the display device 104. The control passes to the end 512.

In accordance with an embodiment of the disclosure, an image-processing apparatus for variable length coding of header for image compression is disclosed. The image-processing apparatus 102 (shown in FIG. 1), may comprise one or more circuits. The one or more circuits may correspond to, for example, the image processor 202, the transform coder 206, the quantizer 208, the predictor 210, the entropy coder 212, and the HGE 212a (shown in FIG. 2). The one or more circuits may be configured to generate a plurality of encoded header sections for a plurality of blocks of an input image stored in a first storage space having a first storage access bandwidth in the memory 204. The plurality of blocks may be obtained based on partition of the stored input image by the image processor 202. The HGE 212a may be configured to generate a header section for a block, for example, a first block of the plurality of blocks. The generated header section may comprise a sequence of header bits having a first number of bits. The HGE 212a may generate the header section for the first block based on application of a sequential encoding scheme on the first block to generate an encoded first block. The application of the sequential encoding scheme is based on a selection of a transform type, a prediction type, a quantization parameter (QP), and a coding type for the first block. The HGE 212a may further encode the generated header section in which the sequence of header bits may indicate the coding type, the transform type, the prediction type, and the QP value selected in the sequential encoding scheme applied on the first block. The selected QP value in the generated header section may be encoded by variable length coding to reduce the first number of bits to a second number of bits in the encoded header section of the first block. Based on encoding of the selected QP value by variable length coding, the encoded first block may be transmitted, via the communication channel, in a reduced second time period.

In conventional image compression techniques, an end-to-end compression and decompression may be performed on digital image data and/or videos, such as an input image. Typically, in conventional image/video compression techniques, either a single coding technique is used, such as DCT or 2D DCT, or a plurality of coding techniques denoted as a coding scheme are used, such as DCT and entropy coding, DCT and quantization, quantization and entropy coding, in different permutation and combination of known coding schemes and standards, such as Joint Photographic Experts Group (JPEG) and High Efficiency Video Coding (HEVC). A particular sequence of selected coding scheme may change the amount of compression. The disclosed codec, such as the image-processing apparatus 102, may generate an encoded bit stream of the input image, by application of a different sequential coding scheme, such as firstly transform coding, followed by quantization coding, predictive coding, and then entropy coding. Unlike the HEVC, where prediction is performed prior to the transform coding, the disclosed codec, such as the image-processing apparatus 102, may generate the encoded bit stream of the input image by application of the different sequential encoding scheme, which starts with the transform coding by application of the forward transform.

In certain scenarios, at the time of transmission of the encoded bit stream of the image, a header section is also transmitted in the encoded bit stream. The header section, which does not include actual image data, may be required in order to signal the decoder on how to perform decompression operations. The presence of the header section in the encoded bit stream of the block may require extra storage space and higher memory bandwidth for storage and transmission of the encoded bit stream of the block. Thus, an additional cost to meet the need of the extra storage space and the higher memory bandwidth may add up to an overall storage cost or computational complexity of the codec. Typically, a fixed number of bits are assigned for the header section resulting in wastage of available bits.

In contrast, the disclosed codec, such as the image-processing apparatus 102, may generate an encoded header section of a block of a plurality of blocks of the input image, storable in a reduced storage space having a reduced storage access bandwidth, which may be transmitted to the decoder 106. The generation of the encoded header section, for example, by variable length coding of the selected QP value or joint variable length coding, may reduce the storage space and the storage access bandwidth of the generated encoded bit stream. Therefore, the need of the extra storage space and higher memory bandwidth for storage and transmission time of the encoded bit stream of the block may be reduced, thereby, reducing the overall storage cost and computational complexity of the codec, such as the image-processing apparatus 102.

The image-processing apparatus 102 may find application in compression of ultra-definition video, image, 4K video, and other digital images or video used in consumer electronic devices, such as TV, camera, smart phone, or media streaming apparatus. In accordance with an exemplary aspect of the disclosure, the image-processing apparatus 102 may be a camera that may include a codec, such as the image-processing apparatus 102 and the decoder 106. Thus, all the operations executed by the image-processing apparatus 102 as described in the present disclosure, may also be executed by the camera. Typically, during capture of an image or a sequence of image frames of a video by the camera, raw data is captured which needs to be compressed to save memory space and memory access bandwidth. In view of the increased popularity of high definition image or video, such as ultra-definition video, image, 4K video, and other digital images or video, it is increasingly critical to develop advanced image compression techniques that may make possible high compression and still exemplify low hardware complexity. The camera may have a limited memory space as provided by the manufacturer, or may be expandable, by use of a flash memory, such as the SD card. However, additional memory hardware involves additional cost. The camera may generate the encoded header section by the codec based on selected encoding parameters (for example, a selected transform type, a selected prediction type, a selected QP value, and a selected coding type), encoded by variable length coding, as described, for example, in FIG. 3. Further, at the time of display of the compressed image (such as the generated encoded bit stream with the quantized value signal stored as compressed image), the codec of the camera may read the header bits that corresponds to the decoding parameters (for example, the selected transform type, the selected prediction type, the selected QP value, and the selected coding type). Thereafter, the codec of the camera may determine the decoding parameters and the type of sequential encoding scheme applied on the input image. Accordingly, the codec may execute inverse scanning, DPCM prediction, inverse quantization, and inverse transform to render the input image on the display device 104. Example of various operations executed by the camera may be understood, for example, from the flowchart 400 and 500 of FIG. 4 and FIG. 5, respectively. Similar to the camera, all the operations executed by the image-processing apparatus 102 as described in the present disclosure, such as in FIGS. 1 to 5, may be executed by the image-processing apparatus 102 in case of implementation in a camcorder, a smart phone, or a TV, for efficient compression to save the memory space, as described.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for variable length coding of header for image compression. The at least one code section may cause the machine and/or computer to perform the steps that comprise partition a stored input image into a plurality of blocks. The at least one code section in the image-processing apparatus 102 may cause the machine and/or computer to perform the operations that comprise generating a header section for a first block of the plurality of blocks, wherein the header section may comprise a sequence of header bits having a first number of bits. The header section for the first block may be generated based on application of a sequential encoding scheme on the first block to generate an encoded first block. The application of the sequential encoding scheme is based on a selection of a transform type, a prediction type, a quantization parameter (QP), and a coding type of—the first block. The at least one code section in the image-processing apparatus 102 may cause the machine and/or computer to perform the operations that further comprise encoding, by the HGE 212a, the generated header section in which the sequence of header bits may indicate the coding type, the transform type, the prediction type, and the QP value selected in the sequential encoding scheme applied on the first block. The selected QP value may be encoded by variable length coding to reduce the first number of bits to a second number of bits in the encoded header section of the first block. Based on encoding of the selected QP value by variable length coding, the encoded first block may be transmitted, via the communication channel, in a reduced second time period (in comparison to the first time period).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image-processing apparatus for image compression, comprising:
a memory configured to store an input image in a first storage space; and
one or more circuits configured to:
partition said stored input image into a plurality of blocks;
execute a sequential encoding scheme on a first block of said plurality of blocks to generate an encoded first block, wherein
said execution of said sequential encoding scheme is based on a selection of a transform type, a prediction type, a quantization parameter (QP) value, and a coding type for said first block, and
said sequential encoding scheme to generate said encoded first block comprises sequential application of a transform coding process by said selected transform type, a quantization coding process by said selected QP value, a predictive coding process by said selected prediction type, and an entropy coding process in an order;
generate a header section for said first block based on said execution of said sequential encoding scheme on said first block, wherein
said generated header section comprises a sequence of header bits having a first number of bits, and
said sequence of said header bits indicate said coding type, said transform type, said prediction type, and said QP value selected in said sequential encoding scheme applied on said first block; and
encode said generated header section, wherein
said header bits corresponding to said coding type indicate use of one of a pulse code modulation (PCM) based coding process or a forward transform to encode pixels of said first block,
at least said selected QP value is encoded by a variable length coding process such that said encoded header section comprises a second number of bits that are storable in a reduced second storage space in said memory, and
said second number of bits is less than said first number of bits.

2. The image-processing apparatus according to claim 1, wherein
said one or more circuits are further configured to generate transformed coefficients of said first block based on execution of said transform coding process on pixel values of said pixels of said first block,
said execution of said transform coding process on said pixel values is based on said transform type, and
said transform type is one of a row-based one-dimensional transform or a column-based one-dimensional transform.

3. The image-processing apparatus according to claim 2, wherein
said one or more circuits are further configured to generate quantized-transformed coefficients of said first block based on execution of said quantization coding process on said transformed coefficients of said first block,
said execution of said quantization coding process on said transformed coefficients is based on said QP value, and
said QP value is selected from a defined set of QP values.

4. The image-processing apparatus according to claim 3, wherein
said one or more circuits are further configured to generate quantized-transformed residual levels of said first block based on execution of said predictive coding process on said quantized-transformed coefficients of said first block,
said execution of said predictive coding process on said quantized-transformed coefficients is based on said prediction type, and
said prediction type is one of a DC-only based prediction or an all-frequency-based prediction.

5. The image-processing apparatus according to claim 4, wherein
said one or more circuits are further configured to execute said entropy coding process on said quantized-transformed residual levels of said first block,
a DC component of said first block is encoded based on at least one of a fixed length code or a variable length code, and
AC components of said first block are entropy coded based on at least one of a Huffman table-based encoding process or an Exponential-Golomb encoding process.

6. The image-processing apparatus according to claim 1, wherein said selected QP value of said first block is encoded by said variable length coding process in said encoding of said generated header section, based on pixel values of said first block that correspond to a luminance component of said pixels.

7. The image-processing apparatus according to claim 1, wherein said one or more circuits are further configured to jointly encode said selected coding type, said selected transform type, said selected prediction type, and said selected QP value by said variable length coding process in said encoding of said generated header section, based on pixel values of said first block that correspond to a chrominance component of said pixels.

8. The image-processing apparatus according to claim 1, wherein said one or more circuits are further configured to signal said encoded header section of said first block in said encoded first block, to a decoder that receives said encoded first block for decompression.

9. An image-processing method, comprising:
retrieving, by one or more circuits, an input image stored in a first storage space in a memory that is transmissible from an image-processing apparatus to a display device via a communication channel in a first time period;
partitioning, by said one or more circuits, said retrieved input image into a plurality of blocks;
executing a sequential encoding scheme on a first block of said plurality of blocks to generate an encoded first block, wherein
said execution of said sequential encoding scheme is based on a selection of a transform type, a prediction type, a quantization parameter (QP) value, and a coding type for said first block, and
said sequential encoding scheme to generate said encoded first block comprises sequential application of transform coding by said selected transform type, quantization coding by said selected QP value, predictive coding by said selected prediction type, and entropy coding in an order;
generating, by said one or more circuits, a header section for said first block based on said execution of said sequential encoding scheme on said first block, wherein
said generated header section comprises a sequence of header bits having a first number of bits, and
said sequence of said header bits indicate said coding type, said transform type, said prediction type, and said QP value selected in said sequential encoding scheme applied on said first block; and
encoding, by said one or more circuits, said generated header section, wherein
said header bits corresponding to said coding type indicate use of one of pulse code modulation (PCM) based coding or a forward transform for encoding pixels of said first block,
at least said selected QP value is encoded by variable length coding such that said encoded header section comprises a second number of bits that are storable in a reduced second storage space in said memory, and
said second number of bits is less than said first number of bits.

10. The image-processing method according to claim 9, further comprising generating, by said one or more circuits, transformed coefficients of said first block based on execution of said transform coding on pixel values of said pixels, wherein
said execution of said transform coding on said pixel values is based on said transform type, and
said transform type is one of a row-based one-dimensional transform or a column-based one-dimensional transform.

11. The image-processing method according to claim 10, further comprising generating, by said one or more circuits, quantized-transformed coefficients of said first block based on execution of said quantization coding on said transformed coefficients of said first block, wherein
said execution of said quantization coding on said transformed coefficients is based on said QP value, and
said QP value is selected from a defined set of QP values.

12. The image-processing method according to claim 11, further comprising generating, by said one or more circuits, quantized-transformed residual levels of said first block based on execution of said predictive coding on said quantized-transformed coefficients of said first block, wherein
said execution of said predictive coding on said quantized-transformed coefficients is based on said prediction type, and
said prediction type is one of a DC-only based prediction or an all-frequency-based prediction.

13. The image-processing method according to claim 12, further comprising executing, by said one or more circuits, said entropy coding on said quantized-transformed residual levels of said first block,
wherein a DC component of said first block is encoded based on at least one of a fixed length code or a variable length code, and wherein AC components of said first block are entropy coded based on at least one of Huffman table-based encoding or Exponential-Golomb encoding.

14. The image-processing method according to claim 9, wherein said selected QP value of said first block is encoded by said variable length coding in said encoding of said generated header section, based on pixel values of said first block that correspond to a luminance component of said pixels.

15. The image-processing method according to claim 9, further comprising jointly encoding, by said one or more circuits, said selected coding type, said selected transform type, said selected prediction type, and said selected QP value by said variable length coding in said encoding of said generated header section,
wherein said jointly encoding is based on pixel values of said first block that correspond to a chrominance component of said pixels.

16. The image-processing method according to claim 9, further comprising signaling, by said one or more circuits, said encoded header section of said first block in said encoded first block, to a decoder that receives said encoded first block for decompression.

* * * * *